US008228866B2

(12) United States Patent
Takano et al.

(10) Patent No.: US 8,228,866 B2
(45) Date of Patent: Jul. 24, 2012

(54) HIGH-SPEED DOWNLINK PACKET ACCESS SYSTEM, BASE STATION, MOBILE STATION, AND COMMUNICATION CONTROL METHOD DURING A SOFT HANDOVER

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 798 days.

(21) Appl. No.: 10/509,867

(22) PCT Filed: Apr. 3, 2003

(86) PCT No.: PCT/JP03/04290
§ 371 (c)(1),
(2), (4) Date: Oct. 1, 2004

(87) PCT Pub. No.: WO03/084274
PCT Pub. Date: Oct. 9, 2003

(65) Prior Publication Data
US 2005/0277419 A1    Dec. 15, 2005

(30) Foreign Application Priority Data

Apr. 3, 2002    (JP) ................................. 2002-100701
May 8, 2002    (JP) ................................. 2002-132224

(51) Int. Cl.
*H04W 4/00* (2009.01)
*H04W 36/00* (2009.01)
*H04B 7/00* (2006.01)
(52) U.S. Cl. .......................... 370/331; 455/442; 455/522
(58) Field of Classification Search .................. 370/331; 455/442, 436, 522, 466
See application file for complete search history.

(56) References Cited

U.S. PATENT DOCUMENTS

| 5,423,078 | A | * | 6/1995 | Epperson et al. | .......... 455/553.1 |
| 6,070,084 | A | * | 5/2000 | Hamabe | ........................ 455/522 |
| 6,119,018 | A | * | 9/2000 | Kondo | ........................... 455/522 |
| 6,351,650 | B1 | * | 2/2002 | Lundby et al. | ................. 455/522 |
| 6,473,624 | B1 | * | 10/2002 | Corbett et al. | ................ 455/522 |
| 6,546,252 | B1 | * | 4/2003 | Jetzek et al. | .................. 455/437 |
| 6,584,087 | B1 | * | 6/2003 | Czaja et al. | .................... 370/335 |

(Continued)

FOREIGN PATENT DOCUMENTS
EP           936751 A2 *   8/1999
(Continued)

OTHER PUBLICATIONS

Samsung,UL Power Control for HSDPA, 3GPP TSG-RAN WG1 #22, Nov. 19, 2001, R1-01-1177, URL, http://www.3gpp.org/ftp/tsg_ran/WG1_RL1/TSGR1_22/Docs/Zips/R1-01-1177.zip.

(Continued)

*Primary Examiner* — Christopher M Brandt
(74) *Attorney, Agent, or Firm* — Sughrue Mion, PLLC

(57) ABSTRACT

Immediately before transmitting a packet signal, a packet transmission base station (BS1) increases a target ISR of UL DPCH (S12), increases the TPC transmission power transmitted by the DPCH (S13), increases a power balancing reference power, and increases a DL DPCH transmission power (S14). In a mobile station (MS3), during packet reception, only a packet transmission base station (1) controls the UL DPCH transmission power (S15). This improves the reception quality at the base station (1) of HS-DPCCH including ACK/NACK and reduces the error ratio of the ACK/NACK signal.

10 Claims, 11 Drawing Sheets

U.S. PATENT DOCUMENTS

| | | | |
|---|---|---|---|
| 6,587,696 B1 * | 7/2003 | Ma et al. | 455/522 |
| 6,650,905 B1 * | 11/2003 | Toskala et al. | 455/522 |
| 6,704,581 B1 * | 3/2004 | Park et al. | 455/553.1 |
| 6,757,319 B1 * | 6/2004 | Parsa et al. | 375/141 |
| 6,771,963 B1 * | 8/2004 | Cheng et al. | 455/437 |
| 6,823,193 B1 * | 11/2004 | Persson et al. | 455/522 |
| 6,873,857 B1 | 3/2005 | Kanemoto et al. | |
| 6,961,572 B2 * | 11/2005 | Needham et al. | 455/442 |
| 6,983,165 B1 * | 1/2006 | Hiramatsu | 455/522 |
| 7,010,318 B2 * | 3/2006 | Chang et al. | 455/522 |
| 7,058,028 B1 * | 6/2006 | Holma et al. | 370/318 |
| 2002/0009061 A1 * | 1/2002 | Willenegger | 370/328 |
| 2002/0071407 A1 * | 6/2002 | Koo et al. | 370/335 |
| 2002/0077140 A1 * | 6/2002 | Monogioudis et al. | 455/522 |
| 2002/0077141 A1 * | 6/2002 | Hwang et al. | 455/522 |
| 2002/0082019 A1 * | 6/2002 | Sunay et al. | 455/442 |
| 2002/0094837 A1 * | 7/2002 | Hamabe et al. | 455/522 |
| 2002/0111169 A1 * | 8/2002 | Vanghi | 455/436 |
| 2002/0136193 A1 * | 9/2002 | Chang et al. | 370/347 |
| 2002/0173309 A1 * | 11/2002 | Shahidi et al. | 455/442 |
| 2002/0196766 A1 * | 12/2002 | Hwang et al. | 370/342 |
| 2003/0021243 A1 * | 1/2003 | Hamalainen | 370/329 |
| 2003/0086389 A1 * | 5/2003 | Hayashi et al. | 370/328 |
| 2003/0157953 A1 * | 8/2003 | Das et al. | 455/522 |
| 2004/0224692 A1 * | 11/2004 | Hamabe | 455/442 |

FOREIGN PATENT DOCUMENTS

| | | |
|---|---|---|
| JP | 9-312609 A | 12/1997 |
| JP | 11-313356 A | 11/1999 |
| JP | 11308655 A | 11/1999 |
| JP | 2001127702 A | 5/2001 |
| JP | 2001217773 A | 8/2001 |
| JP | 2001-274748 A | 10/2001 |
| JP | 2002-26747 A | 1/2002 |
| JP | 2002-290327 A | 10/2002 |
| JP | 2002-325063 A | 11/2002 |
| WO | WO 0217511 A2 | 2/2002 |

OTHER PUBLICATIONS

Japanese Office Action dated Nov. 1, 2011 issued by the Japanese Patent Office in corresponding Japanese Application No. 2008-300281.

* cited by examiner

HIGH-SPEED DOWNLINK PACKET ACCESS SYSTEM, BASE STATION, MOBILE STATION, AND COMMUNICATION CONTROL METHOD DURING A SOFT HANDOVER

TECHNICAL FIELD

The present invention relates to a cellular system, a base station, a mobile station, and a communication control method.

BACKGROUND ART

As cellular systems of this type, various systems have conventionally been proposed. Recently, as one of the cellular systems of this type, the cellular system in the form of a high-speed downlink packet transmission (HSDPA: High-Speed Downlink Packet Access) system has been proposed by the 3GPP (3rd Generation Partnership Project).

Although description will be given hereinbelow about an example where the foregoing HSDPA cellular system is used as a cellular system that carries out packet communications, the present invention is not limited to the HSDPA.

In the HSDPA system, a high-speed downlink shared channel (HS-PDSCH: High-Speed Physical Downlink Shared Channel) is used for transmitting high-speed data in downlink from a base station to mobile stations in the cellular system and further for transmission in downlink from the base station to the mobile stations. This HS-PDSCH is used for data transmission from each base station to a plurality of mobile stations and, for this purpose, each base station or its control station determines a schedule for performing data transmission to the respective mobile stations to thereby transmit data at timings that differ per mobile station (time-division system).

In order to control such data transmission from each base station to the mobile stations, each base station sets a DPCH (Dedicated Physical Channel) being a dedicated channel with respect to each of the plurality of mobile stations. This DPCH is used for transmitting control information by its downlink signal from the base station to the mobile station and for transmitting a control signal by its uplink signal from the mobile station to the base station.

In each mobile station, although the ratio of time for receiving data using the HS-PDSCH is small, the DPCH continues to be set with respect to the base station even in a data waiting state where data is not received, so that transmission of data can be started in a short time after requesting the transmission of data. Therefore, although each base station performs data transmission with respect to only one mobile station at the same time, many mobile stations are in the data waiting state and set DPCHs with respect to the base station.

On the other hand, in the cellular system, there is a technique called soft handover where a mobile station sets channels with respect to a plurality of base stations at the same time. Each base station transmits a common pilot signal at a predetermined power, and a mobile station sets a DPCH with respect to such a base station of which the reception power of the common pilot signal is the greatest. On the other hand, in the soft handover, if there exists another base station of which the reception power of the common pilot signal has only a small difference, the mobile station also sets a DPCH with respect to such another base station, resulting in setting the DPCHs with respect to the plurality of base stations. In the following description, those base stations with the DPCHs set in the soft handover will be called connection base stations.

Further, in the cellular system, a technique called a high-speed closed-loop transmission power control is applied. This high-speed closed-loop transmission power control is applied to a DPCH with respect to both its uplink and downlink. In the DPCH uplink transmission power control, a base station uses a dedicated pilot signal included in an uplink signal to measure its reception SIR (Signal to Interference Ratio) and compares between a measured value thereof and a predetermined target SIR. Then, the base station makes notification to a mobile station by including TPC (Transmit Power Control) bits indicative of power increase in a DPCH downlink signal when the measured value is smaller than the target SIR, and otherwise, TPC bits indicative of power decrease. Then, the mobile station receives the TPC bits and, depending on the TPC bits, increases or decreases the transmission power.

In case of using this uplink transmission power control along with the soft handover, the mobile station receives TPC bits from each of a plurality of connection base stations and, when at least one set of the TPC bits is indicative of power decrease, the mobile station decreases the DPCH transmission power, and otherwise (i.e. when all TPC bits are indicative of power increase), increases the DPCH transmission power. By implementing such a transmission power control, the reception quality of the uplink signal satisfies the target SIR in at least one connection base station, and simultaneously, the reception qualities of the uplink signals are prevented from exceeding the target SIR in all connection base stations, to thereby prevent the uplink interference wave power from increasing.

On the other hand, in the DPCH downlink transmission power control, a mobile station uses a dedicated pilot signal included in a downlink signal to measure its reception SIR and compares between a measured value thereof and a predetermined target SIR. Then, the mobile station makes notification to a base station by including TPC bits indicative of power increase in a DPCH uplink signal when the measured value is smaller than the target SIR, and otherwise, TPC bits indicative of power decrease. Then, the base station receives the TPC bits and, depending on the TPC bits, increases or decreases the transmission power.

In case of using this downlink transmission power control along with the soft handover, the mobile station receives DPCH downlink signals respectively from a plurality of connection base stations and combines them together, and compares a reception SIR of a downlink signal after the combination with a target SIR to determine TPC bits. Then, the mobile station transmits the common TPC bits to the plurality of connection base stations and, depending on the TPC bits, the connection base stations respectively increase or decrease the transmission power. By causing all connection base stations to increase or decrease the transmission power according to the common TPC bits as described above, the balance is kept in transmission power among the connection base stations so that the downlink signal transmitted from such a base station that causes the minimum propagation loss between itself and the mobile station is received at the mobile station with excellent quality, thereby preventing the transmission power of the downlink signals from increasing more than necessary to thus prevent the downlink interference wave power from increasing.

The transmission power control and the soft handover as described above have become an effective technique as a radio access system, particularly for reducing the transmission power to decrease the interference wave power to thereby increase the link capacity in the CDMA (Code Division Multiple Access) cellular system.

Here, during the soft handover, as the system is schematically shown in FIG. 10, a mobile station (MS) 3 has DPCHs simultaneously connected to a plurality of connection base stations (BS) 1 and 2 as described before, but an HS-PDSCH is connected to only one base station (base station 1 in the figure). Further, as described before, it is necessary for the mobile station 3 to transmit to the base station reception confirmation notification (ACK/NACK: Acknowledge/Non-Acknowledge) information indicative of whether or not the mobile station 3 has received packets transmitted by the HS-PDSCH without error, and this reception confirmation notification information is transmitted by using an uplink HS-DPCCH (High-Speed Dedicated Physical Control Channel: HS-PDSCH dedicated control channel including packet transmission control information).

A relationship between the uplink HS-DPCCH and the uplink DPCH is as shown in FIG. 11. The DPCH is composed of a DPCCH (Dedicated Physical Control Channel) and a DPDCH (Dedicated Physical Data Channel). The DPCCH includes a dedicated pilot channel (Pilot), TPC bits, and an FBI (Feed Back Information). On the other hand, the DPDCH is data and includes user information and control information. The DPCCH and the DPDCH are mutually orthogonally modulated, multiplexed, and transmitted.

The HS-DPCCH is allocated a slot length corresponding to three slots of the DPCCH or DPDCH and includes the foregoing reception confirmation notification (ACK/NACK) information and a CQI (Channel Quality Indicator) indicative of a downlink quality. The HS-DPCCH is code-multiplexed with the DPCH and transmitted. Since judgment on the ACK (receipt)/NACK (non) signal included in the HS-DPCCH is made only by the base station transmitting the HS-PDSCH, i.e. the packet transmission base station, diversity combination thereof between the base stations is not carried out.

On the other hand, as shown in FIG. 10, the uplink DPCHs are subjected to diversity combination between the connection base stations 1 and 2 in a radio network control station (RNC) 10. The DPCH is controlled to achieve a predetermined reception quality by the high-speed closed-loop transmission power control as described above, and the HS-DPCCH is transmitted at a transmission power PH which is the sum of a transmission power PD of the DPCH and a predetermined offset power Δ added thereto. That is, the HS-DPCCH is transmitted in a relationship of $$PH=PD+\Delta \quad (1).$$

In this manner, based on the ACK/NACK transmitted from the mobile station by using the HS-PDCCH, the packet transmission base station judges whether or not packets are correctly received by the mobile station. If judged to be NACK, the packet transmission base station deems that the corresponding packets are not correctly received by the mobile station, and retransmits the packets in question to thereby prevent a packet loss.

Here, particularly, if NACK is taken for ACK, although packets are not correctly received, the subject base station transmits next packets, and therefore, those packets not correctly received are not retransmitted and thus are lost in the mobile station, resulting in occurrence of a packet loss. Therefore, it is necessary that the reception error rate for NACK be sufficiently smaller than that for ACK, or, in other words, it is necessary that the reception quality of the ACK/NACK signal at the packet transmission base station be sufficiently high.

However, unless any measure is taken, the reception quality of ACK/NACK is lowered due to operation as described hereinbelow.

During the execution of the soft handover, the transmission power of the UL (Up-Link) DPCH serving as a reference of the transmission power of the HS-DPCCH is controlled in the following manner. When a reception SIR of the UL DPCH is greater than a reference SIR, the connection base station transmits a TPC signal that reduces the power, while, when the reception SIR after combination is smaller than the reference SIR, it transmits a TPC signal that increases the power.

On the other hand, the mobile station in the execution of the soft handover receives the TPC signal from each connection base station and increases the transmission power when all TPC signals are indicative of power increase, while decreases the transmission power when at least one of the TPC signals is indicative of power decrease. In this event, even if the reception SIR of the UL DPCH of the packet transmission base station is less than the reference SIR, when the reception SIR of the UL DPCH of the base station other than the packet transmission base station is equal to or more than the reference SIR, it represents that at least one of the TPC signals to the mobile station is indicative of power decrease. Consequently, the mobile station decreases the UL DPCH transmission power so that the reception SIR of the UL DPCH of the packet transmission base station is further reduced. Thus, the reception quality of the HS-DPCCH is lowered.

As described above, there is a problem that, during the soft handover, the reception quality of the HS-DPCCH is lowered due to the TPC signals of other than the packet transmission base station so that the ACK/NACK reception error is liable to occur.

During the execution of the soft handover, the transmission power of the DL (Down-Link) DPCH including the TPC signals for controlling the UL DPCH transmission power is controlled in the following manner. The mobile station during the execution of the soft handover combines DL DPCHs transmitted from the respective connection base stations and transmits a TPC signal that decreases the power when a reception SIR after the combination is greater than a reference SIR, while transmits a TPC signal that increases the power when the reception SIR after the combination is smaller than the reference SIR, and each base station controls the transmission power according to that TPC signal.

In this event, even if the reception SIR of the DL DPCH of the packet transmission base station is smaller than the reference SIR, when the reception SIRs of the DL DPCHs of the base stations other than the packet transmission base station are greater, the reception SIR after the combination becomes greater than the reference SIR. Consequently, each base station decreases the DL DPCH transmission power so that the reception SIR of the DL DPCH of the packet transmission base station is further reduced. Thus, the reception quality of the TPC signal transmitted from the packet transmission base station is lowered so that the TPC signal reception error increases. In this event, even if the packet transmission base station transmits a TPC signal that increases the transmission power of the mobile station for increasing the reception SIR of the UL DPCH, there is a problem that the reception SIR of the UL DPCH is lowered due to an error of that TPC signal and the reception quality of the HS-DPCCH is lowered accordingly so that the ACK/NACK reception error is liable to occur.

Particularly, due to occurrence of the TPC signal reception error in each base station, the transmission power of the DL DPCH of the packet transmission base station becomes lower than the transmission power of the DL DPCH of each of the other base stations, and therefore, the foregoing problem is liable to occur.

As conventional methods for improving the foregoing problems, the following two methods may be considered.

As the first method, there is a method where when a mobile station is in the soft handover state, the offset power Δ of the HS-DPCCH is increased as compared with the non soft handover state. In this method, there is a drawback that since a proper Δ differs depending on the number of connection base stations, the UL reception quality of a link transmitting packets, and so forth, it is difficult to determine a proper increment of Δ. Further, there is a drawback that since it is necessary to increase the value of Δ with a margin in order to sufficiently reduce the ACK/NACK reception error rate, the uplink transmission power increases more than necessary so that the power consumption of the mobile station increases and simultaneously the uplink interference wave power increases.

Moreover, there is a drawback that since the transmission power of the HS-DPCCH increases as compared with the DPCCH, the reception quality of the pilot signal of the DPCCH is degraded so that the channel estimation accuracy is degraded. It may be considered to add a pilot signal to the HS-DPCCH in order to clear the foregoing drawback. However, there is a problem that since the pilot signal that is used only during the soft handover is constantly transmitted, the use efficiency of resources is reduced.

As the second method, there is a method where, during the soft handover (SHO), a packet transmission base station produces a signal TPC-HS for a high-speed closed-loop control type transmission power control for the reception quality of the HS-DPCCH and transmits it instead of the normal TPC signal or both to a mobile station. In this method, in order to satisfy qualities of both the ACK signal and the NACK signal, the packet transmission base station must set a target SIR for the one that is required a stricter quality. Therefore, there is a drawback that excessive transmission signals are consumed. Further, there is also a drawback that, in case of transmitting the TPC-HS instead of the normal TPC, the power of the HS-DPCCH increases to cause interference and consequently the DPCH channel estimation accuracy of other channels is degraded. Moreover, there is a drawback that, in case of transmitting the TPC-HS apart from the normal TPC, it is necessary to change a slot format.

It is an object of the present invention to provide a cellular system that can receive with a high quality in a base station an ACK/NACK signal transmitted from a mobile station to the base station for notification of packet reception confirmation, while solving the foregoing various conventional problems.

DISCLOSURE OF THE INVENTION

According to the present invention, there is obtained a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said cellular system characterized in that said mobile station comprises transmission power control means for controlling a transmission power of the uplink dedicated channel during reception of said packet based only on the transmission power control information included in the downlink dedicated channel from the packet transmission base station. Further, the packet transmission base station is characterized by comprising means for controllably changing a target reception quality of said dedicated channel at the packet transmission base station from a first value to a second value greater than said first value during said packet transmission, and said transmission power control means is characterized by setting an increasing width of the transmission power of said uplink dedicated channel to be greater than a decreasing width thereof.

According to the present invention, there is obtained a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said cellular system characterized in that the packet transmission base station comprises means for controllably changing a transmission power of the transmission power control information included in the downlink dedicated channel from a first value to a second value greater than said first value during said packet transmission.

According to the present invention, there is obtained a cellular system comprising a mobile station and a plurality of base stations being in a state of soft handover with said mobile station and each setting dedicated channels with respect to said mobile station, wherein a reference power is used for balancing transmission powers of said dedicated channels between said base stations being in the state of soft handover, and only the specific base station in said base stations being in the state of soft handover sets a shared channel with respect to said mobile station to perform transmission of a packet, said cellular system characterized in that the packet transmission base station comprises means for controllably changing a value of said reference power from a first value to a second value greater than said first value during said packet transmission. Further, said packet transmission base station is characterized by comprising means for controllably further increasing a transmission power of a downlink dedicated channel, simultaneously with increasing the value of said reference power.

According to the present invention, there is obtained a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said cellular system characterized in that said mobile station comprises means for controllably changing a target reception quality of said dedicated channel at said mobile station from a first value to a second value greater than said first value during reception of said packet.

According to the present invention, there is obtained a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said cellular system characterized in that said mobile station comprises means for producing said power control information of the downlink dedicated channel during reception of said packet based only on a reception quality at said mobile station of said dedicated channel from the packet transmission base station.

According to the present invention, there is obtained a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said cellular system characterized in that said mobile station comprises offset power determining means for determining an increment of said offset power depending on reception qualities of downlinks of said respective base stations being in the soft handover.

According to the present invention, there is obtained a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said cellular system characterized in that said mobile station comprises offset power determining means for determining an increment of said offset power depending on the number N of said base stations being in the soft handover.

According to the present invention, there is obtained a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including information of reception confirmation notification (ACK/NACK) about said packet to the packet transmission base station at a transmission power obtained by adding a predetermined offset power to a transmission power of an uplink dedicated channel, said cellular system characterized in that said packet transmission base station comprises packet transmission control means for controlling transmission of said packet depending on a reliability of a judgment result about said reception confirmation notification.

According to the present invention, there is obtained a communication control method in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said communication control method characterized by comprising a transmission power control step, in said mobile station, of controlling a transmission power of the uplink dedicated channel during reception of said packet based only on the transmission power control information included in the downlink dedicated channel from the packet transmission base station. Further, said communication control method is characterized by comprising a step, in said packet transmission base station, of controllably changing a target reception quality of said dedicated channel at the packet transmission base station from a first value to a second value greater than said first value during said packet transmission, and said transmission power control step is characterized by setting an increasing width of the transmission power of said uplink dedicated channel to be greater than a decreasing width thereof.

According to the present invention, there is obtained a communication control method in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said communication control method characterized by comprising a step, in the packet transmission base station, of controllably changing a transmission power of the transmission power control information included in the downlink dedicated channel from a first value to a second value greater than said first value during said packet transmission.

According to the present invention, there is obtained a communication control method in a cellular system comprising a mobile station and a plurality of base stations being in a state of soft handover with said mobile station and each setting dedicated channels with respect to said mobile station, wherein a reference power is used for balancing transmission powers of said dedicated channels between said base stations being in the state of soft handover, and only the specific base station in said base stations being in the state of soft handover sets a shared channel with respect to said mobile station to perform transmission of a packet, said communication control method characterized by comprising a step, in the packet transmission base station, of controllably changing a value of said reference power from a first value to a second value greater than said first value during said packet transmission. Further, said communication control method is characterized by comprising a step, in said packet transmission base station, of controllably further increasing a transmission power of a downlink dedicated channel, simultaneously with increasing the value of said reference power.

According to the present invention, there is obtained a communication control method in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said communication control method characterized by comprising a step, in said mobile station, of controllably changing a target reception quality of said dedicated channel at said mobile station from a first value to a second value greater than said first value during reception of said packet.

According to the present invention, there is obtained a communication control method in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said communication control method characterized by comprising a step, in said mobile station, of producing said power control information of the downlink dedicated channel during reception of said packet based only on a reception quality at said mobile station of said dedicated channel from the packet transmission base station.

According to the present invention, there is obtained a communication control method in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said communication control method characterized by comprising an offset power determining step, in said mobile station, of determining an increment of said offset power depending on reception qualities of downlinks of said respective base stations being in the soft handover.

According to the present invention, there is obtained a communication control method in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said communication control method characterized by comprising an offset power determining step, in said mobile station, of determining an increment of said offset power depending on the number N of said base stations being in the soft handover.

According to the present invention, there is obtained a communication control method in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including information of reception confirmation notification (ACK/NACK) about said packet to the packet transmission base station at a transmission power obtained by adding a predetermined offset power to a transmission power of an uplink dedicated channel, said communication control method characterized by comprising a packet transmission control step, in said packet transmission base station, of controlling transmission of said packet depending on a reliability of a judgment result about said reception confirmation notification.

According to the present invention, there is obtained a base station in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said packet transmission base station characterized by comprising means for controllably changing a target reception quality of said dedicated channel at the packet transmission base station from a first value to a second value greater than said first value during said packet transmission.

According to the present invention, there is obtained a base station in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said packet transmission base station characterized by comprising means for controllably changing a transmission power of the transmission power control information included in the downlink dedicated channel from a first value to a second value greater than said first value during said packet transmission.

According to the present invention, there is obtained a base station in a cellular system comprising a mobile station and a plurality of base stations being in a state of soft handover with said mobile station and each setting dedicated channels with respect to said mobile station, wherein a reference power is used for balancing transmission powers of said dedicated channels between said base stations being in the state of soft handover, and only the specific base station in said base stations being in the state of soft handover sets a shared channel with respect to said mobile station to perform transmission of a packet, said packet transmission base station characterized by comprising means for controllably changing a value of said reference power from a first value to a second value greater than said first value during said packet transmission. Then, said packet transmission base station is characterized by further comprising means for controllably changing a value of a transmission power of a downlink dedicated channel from a first value to a second value greater than said first value, simultaneously with increasing the value of said reference power.

According to the present invention, there is obtained a base station in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including information of reception confirmation notification (ACK/NACK) about said packet to the packet transmission base station at a transmission power obtained by adding a predetermined offset power to a transmission power of an uplink dedicated channel, said packet transmission base station characterized by comprising packet transmission control means for controlling transmission of said packet depending on a reliability of a judgment result about said reception confirmation notification.

According to the present invention, there is obtained a mobile station in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said mobile station characterized by comprising transmission power control means for controlling a transmission power of the uplink dedicated channel during reception of said packet based only on the transmission power control information included in the downlink dedicated channel from the packet transmission base station. Further, said transmission power control means is characterized by setting an increasing width of the transmission power of said uplink dedicated channel to be greater than a decreasing width thereof.

According to the present invention, there is obtained a mobile station in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said mobile station characterized by comprising means for controllably changing a target reception quality of said dedicated channel at said mobile station from a first value to a second value greater than said first value during reception of said packet.

According to the present invention, there is obtained a mobile station in a cellular system comprising a mobile station and a plurality of base stations being in a state of soft handover with said mobile station and each setting dedicated channels with respect to said mobile station, wherein said dedicated channels include an uplink and a downlink dedicated channel, these uplink and downlink dedicated channels each include transmission power control information for the other dedicated channel, and only the specific base station in the base stations being in the state of soft handover sets a shared channel with respect to said mobile station to perform transmission of a packet, said mobile station characterized by comprising means for producing said power control information of the downlink dedicated channel during reception of said packet based only on a reception quality at said mobile station of said dedicated channel from the packet transmission base station.

According to the present invention, there is obtained a mobile station in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said mobile station characterized by comprising offset power determining means for determining an increment of said offset power depending on reception qualities of downlinks of said respective base stations being in the soft handover.

According to the present invention, there is obtained a mobile station in a cellular system comprising a mobile station and a plurality of base stations being in a state of soft handover with said mobile station and each setting dedicated channels with respect to said mobile station, wherein only the specific base station in the base stations being in the state of soft handover sets a shared channel (HS-PDSCH) with respect to said mobile station to perform transmission of a packet, and said mobile station transmits an HS-PDSCH dedicated control channel (HS-DPCCH) including reception confirmation notification information about said packet to the packet transmission base station at a transmission power obtained by adding a predetermined offset power to a transmission power of an uplink dedicated channel, said mobile station characterized by comprising offset power determining means for determining an increment of said offset power depending on the number N of said base stations being in the soft handover.

According to the present invention, there is obtained a cellular system comprising a mobile station and a base station setting dedicated channels with respect to said mobile station, wherein said dedicated channels include an uplink and a downlink dedicated channel, the downlink dedicated channel includes transmission power control information for the uplink dedicated channel, the uplink dedicated channel comprises a dedicated control channel (DPCCH) and a dedicated information channel (DPDCH), said base station sets a shared channel (HS-PDSCH) with respect to said mobile station to perform transmission of a packet, and said mobile station transmits the dedicated information channel to the packet transmission base station at a transmission power obtained by adding a predetermined first offset value to a transmission power of the uplink dedicated control channel, said cellular system characterized in that said mobile station controls the transmission power of the DPCCH depending on said transmission power control information and comprises transmission power suppressing means for suppressing the transmission power of the DPDCH if a transmission power of signals including the DPCCH and the DPDCH exceeds a predetermined maximum transmission power when transmitting the DPDCH at the transmission power obtained by adding said first offset value to the transmission power of the DPCCH.

According to the present invention, there is obtained a communication control method in a cellular system comprising a mobile station and a base station setting dedicated channels with respect to said mobile station, wherein said dedicated channels include an uplink and a downlink dedicated channel, the downlink dedicated channel includes transmission power control information for the uplink dedicated channel, the uplink dedicated channel comprises a dedicated control channel (DPCCH) and a dedicated information channel (DPDCH), said base station sets a shared channel (HS-PDSCH) with respect to said mobile station to perform transmission of a packet, and said mobile station transmits the dedicated information channel to the packet transmission base station at a transmission power obtained by adding a predetermined first offset value to a transmission power of the uplink dedicated control channel, said communication control method characterized by comprising, in said mobile station, a step of controlling the transmission power of the DPCCH depending on said transmission power control information and a step of suppressing the transmission power of the DPDCH if a transmission power of signals including the DPCCH and the DPDCH exceeds a predetermined maximum transmission power when transmitting the DPDCH at the transmission power obtained by adding said first offset value to the transmission power of the DPCCH.

According to the present invention, there is obtained a mobile station in a cellular system comprising a mobile station and a base station setting dedicated channels with respect to said mobile station, wherein said dedicated channels include an uplink and a downlink dedicated channel, the downlink dedicated channel includes transmission power control information for the uplink dedicated channel, the uplink dedicated channel comprises a dedicated control channel (DPCCH) and a dedicated information channel (DPDCH), said base station sets a shared channel (HS-PDSCH) with respect to said mobile station to perform transmission of a packet, and said mobile station transmits the dedicated information channel to the packet transmission base station at a transmission power obtained by adding a predetermined first offset value to a transmission power of the uplink dedicated control channel, said mobile station characterized by controlling the transmission power of the DPCCH depending on said transmission power control information, and comprising transmission power suppressing means for suppressing the transmission power of the DPDCH if a transmission power of signals including the DPCCH and the DPDCH exceeds a predetermined maximum transmission power when transmitting the DPDCH at the transmission power obtained by adding said first offset value to the transmission power of the DPCCH.

BEST MODE FOR CARRYING OUT THE INVENTION

Figure 1:
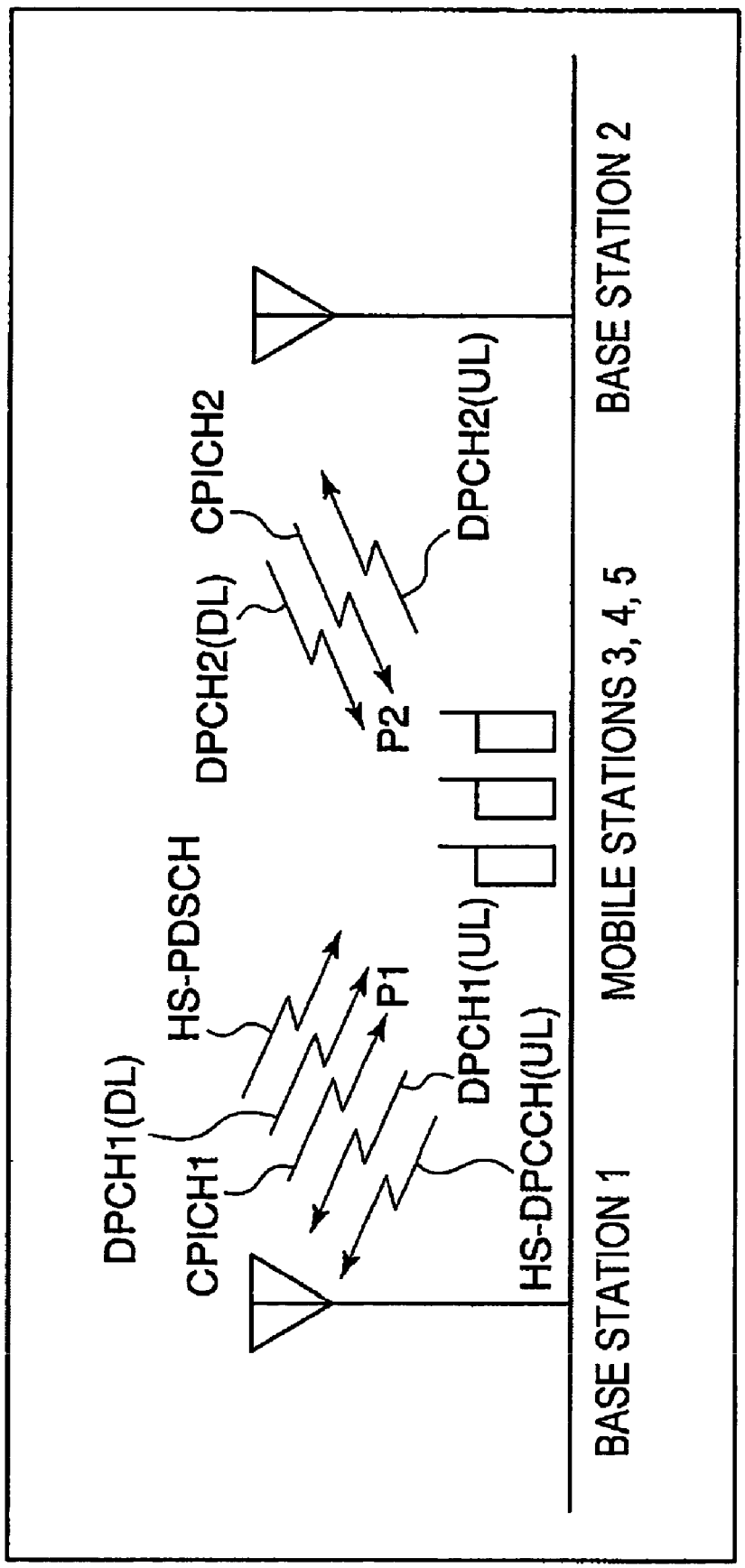
FIG. 1 is a schematic diagram of a cellular system to which embodiments of the present invention are applied.

Referring to the drawings, embodiments 1 to 5 of the present invention will be described hereinbelow. FIG. 1 is a schematic diagram showing one example of a cellular system to which the embodiments 1 to 5 of the present invention are all applied. Referring to the figure, the cellular system comprises a base station 1, a base station 2, and mobile stations 3, 4, and 5. Let the base station 1 and the base station 2 be provided in different cells. Although description will be given in this example about a case where the two base stations 1 and 2 exist with respect to the three mobile stations 3, 4, and 5, the present invention is not limited thereto but also applicable to a case where three or more base stations exist with respect to the three mobile stations 3, 4, and 5. In general, many mobile stations exist with respect to one base station.

Further, the present invention is also applicable to a case where four or more mobile stations exist in this transmission system, while the figure shows as one example a case where the three mobile stations 3, 4, and 5 exist.

The CDMA (Code Division Multiple Access) system is employed as a radio access system between the base stations and the mobile stations 3, 4, and 5.

The figure shows that a signal of an HS-PDSCH, a signal of a DPCH1 (DL: Down-Link: transmission from a base station to a mobile station), and a signal of a CPICH1 (Common Pilot Channel 1) are transmitted from the base station 1 to the mobile station 3, while a signal of a DPCH1 (UL: Up-Link: transmission from a mobile station to a base station) is transmitted from the mobile station 3 to the base station 1. Further, it is shown that a signal of an HS-DPCCH (UL) shown in FIG. 11 is transmitted from the mobile station 3 to the base station 1.

Similarly, it is shown that a signal of a DPCH2 (DL) and a signal of a CPICH2 are transmitted from the base station 2 to the mobile station 3, while a signal of a DPCH2 (UL) is transmitted from the mobile station 3 to the base station 2. Although the receiving base station of the DPCH2 (UL) differs from that of the DPCH1 (UL), the DPCH2 (UL) is the same as the DPCH1 (UL) as a transmission signal of the mobile station. Specifically, it is shown that the signal of the HS-DPSCH and the signal of the CPICH are each a unidirectional signal, while the signal of the DPCH is a bidirectional signal.

The HS-PDSCH is a high-speed signal and is used for transmitting or receiving a large file such as animation for a short time. On the other hand, the CPICH is a common pilot channel (only DL) and a common pilot signal is constantly transmitted from each of the base stations 1 and 2 to the mobile station 3 via this channel.

Figure 11:
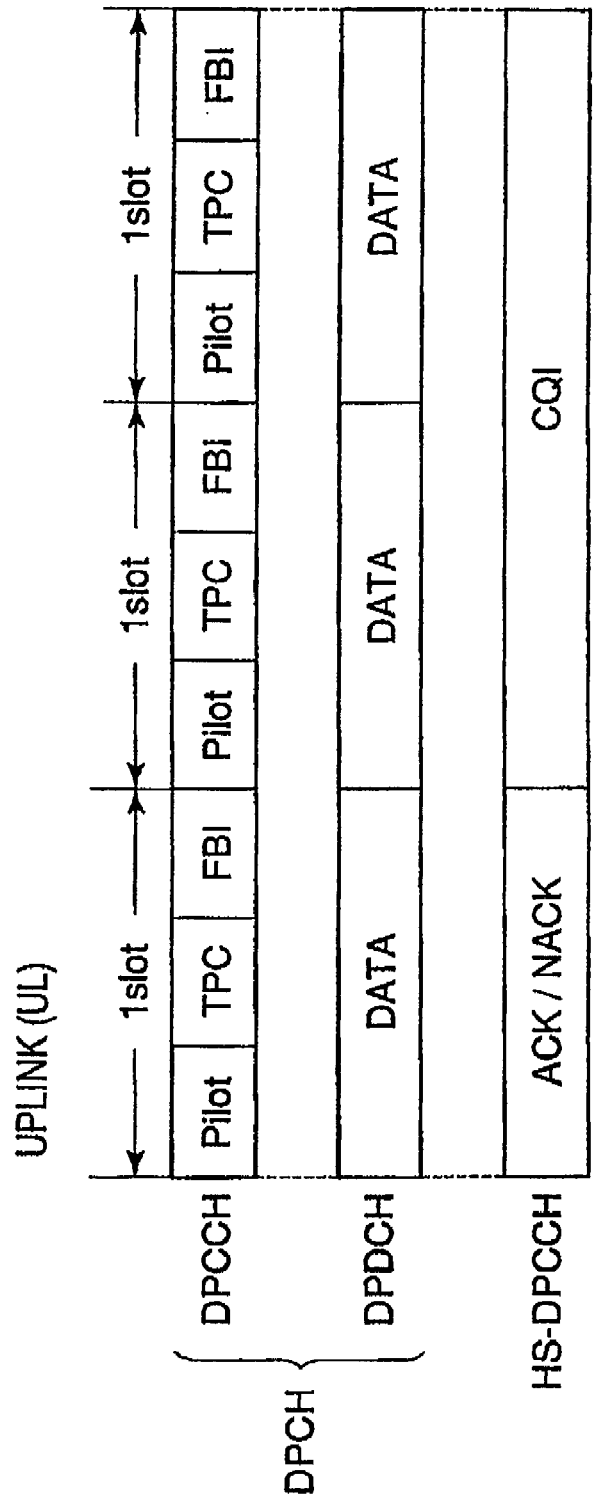
FIG. 11 is a format diagram for explaining a relationship between UL DPCH and HS-DPCCH in an HSDPA system.

The DPCH is a dedicated (physical) channel (UL/DL) and, as described using FIG. 11, is composed of a DPCCH and a DPDCH. As described before, the HS-DPCCH includes an ACK/NACK signal, a CQI indicative of a quality of the downlink propagation path, and so forth. The relationship in transmission power between these DPCCH and HS-DPCCH is as given by the foregoing equation (1).

Next, operation common to all the embodiments 1 to 5 will be described. The base stations 1 and 2 transmit the CPICHs 1 and 2, respectively. This CPICH is spread by a scramble code that differs per cell, and each mobile station identifies a cell by a difference in scramble code. When receiving downlink data, each mobile station sets the DPCH (UL/DL) with respect to one or a plurality of base stations and is brought into a data reception waiting state.

When a difference in reception power of the CPICHs between the base stations 1 and 2 is a predetermined value or less, one mobile station 3 sets the DPCH with respect not only to the base station 1 but also to the base station 2 and thus is in the state of setting the DPCHs with respect to the plurality of base stations 1 and 2 (soft handover).

The UL/DL DPCH includes a dedicated pilot signal (Pilot) in the form of a predetermined bit sequence. The UL DPCH transmission power is controlled by a high-speed closed-loop transmission power control. In this control, the base station uses the dedicated pilot signal of the UL DPCH to measure a DPCH reception SIR and compares its measured value with a target SIR held in that base station. Then, when the measured value is smaller than the target SIR, the base station notifies TPC bits of "power-up" to the mobile station 3 by using the DL DPCH1 or 2, or otherwise, TPC bits of "power-down". The value of the target SIR is notified from a radio network control station RNC (10 in FIG. 10).

Each base station transmits the HS-PDSCH. This HS-PDSCH is a channel higher in speed than the DPCH and is transmitted at a power larger than that of the DL DPCH. Each base station uses one HS-PDSCH for data transmission to a plurality of mobile stations. The RNC or each base station determines a schedule for carrying out data transmission to the respective mobile stations to thereby carry out the data transmission at timings that differ per mobile station. Specifically, as one example, transmission of the HS-PDSCH is first performed to the mobile station 3 and, after completion of the transmission, transmission of the HS-PDSCH is performed to the mobile station 4 and, after completion of the transmission, transmission of the HS-PDSCH is performed to the mobile station 5.

When data to be transmitted to the mobile station 3 arrives at the RNC from a communication network, the RNC sends the data to the base station 1 or 2 having the DPCH set by the mobile station 3. In this case, let the data be sent to the base station 1.

What has been described above is the operation common to all the embodiments 1 to 5. Hereinbelow, description will be given about the embodiment 1 by using a sequence diagram of FIG. 2. When data to be transmitted to the mobile station (MS) 3 arrives at the RNC from the communication network, the RNC sends the data to the base station (BS) having the DPCH set by the mobile station 3. In this case, let the data be sent to the base station 1 (step S10).

The base station 1 gives a notice of data transfer to the mobile station 3 (step S11). Thereafter, the base station 1 increases an SIR for the reception quality of the UL DPCH by a predetermined value (step S12). Further, the base station 1 increases by a predetermined value a transmission power of TPC bits transmitted by the DL DPCH and transmits them (step S13). Further, the base station 1 increases a reference power for power balancing by a predetermined value and further increases a transmission power of the DL DPCH by a predetermined value (step S14).

This power balancing is defined in the 3GPP (3rd Generation Partnership Project) and serves for balancing the DL DPCH transmission powers between the base stations by causing the DL DPCH transmission powers to slowly approach the foregoing reference power in a manner not to affect the closed-loop transmission power control. Accordingly, the reference power for use in that balancing adjustment is increased by the predetermined value in the packet transmission base station 1.

After receiving the data transfer notice from the base station 1, the mobile station 3 controls the transmission power of the UL DPCH transmitted by the own station, only according to a TPC signal transmitted from the packet transmission base station 1 (step S15).

In the state as described above, a first packet #1 of packets obtained by dividing data into blocks is transmitted from the base station 1 to the mobile station 3 by the use of the HS-PDSCH (step S16). When the packet #1 is correctly received at the mobile station 3, ACK is transmitted to the base station 1 by the use of the HS-DPCCH (step S17). Subsequently, likewise, a packet #2 is transmitted from the base station 1 (step S18), and ACK is transmitted from the mobile station 3 to the base station 1 (step S19).

Upon completion of the data transmission, the base station 1 notifies end of data to the mobile station 3 (step S20). In response to the completion of the data transmission, the base station 1 carries out processing of restoring the respective values, which were changed in steps S12 to S14, to the initial states (step S21). On the other hand, in the mobile station 3, the state of controlling the UL DPCH transmission power only by the TPC of the packet transmission base station 1, which was set in step S15, is restored to the initial state of controlling the UL DPCH transmission power by using TPCs of all base stations in the soft handover (step S22). Instead of the notification of end of data, it may be configured to restore to the initial state before the packet transmission when a packet is not transmitted over a predetermined time.

As shown in the foregoing step S15, by performing the transmission power control of the UL DPCH transmitted by the mobile station 3 itself only according to the TPC signal of the packet transmission base station 1, the transmission power of the mobile station can be controlled such that the UL DPCH in the packet transmission base station 1 satisfies a target quality, and therefore, the reception quality of the ACK/NACK signal in the HS-DPCCH transmitted at a power obtained by adding a fixed offset power value ($\Delta$ in the equation (1)) to the UL DPCH also satisfies a target quality. Consequently, the ACK/NACK signal reception accuracy is improved so that the throughput of data transmission by the HS-DPSCH increases.

Further, by increasing the transmission power of the TPC signal transmitted from the packet transmission base station 1 by using the DL DPCH (step S13), or by increasing the power balancing reference power and the DL DPCH transmission power (step S14), the reception error rate for the TPC signal transmitted by the packet transmission base station 1 is reduced so that the transmission power control accuracy in the mobile station 3 is improved, and therefore, the ACK/NACK signal reception quality in the packet transmission base station 1 can be further improved. Moreover, by increasing the UL DPCH target SIR in the packet transmission base station 1 (step S12), the ACK/NACK signal reception quality in the base station 1 can be improved.

According to this embodiment 1, the change in slot format like in the conventional second method is not necessary. Further, since the DPCH and the offset power value of the HS-DPCCH are fixed, there is no occurrence of degradation in channel estimation accuracy caused by degradation in reception quality of the pilot signal of the DPCH like in the conventional first and second methods, and therefore, it is not necessary to add the pilot signal to the HS-DPCCH.

Further, in this embodiment 1, the processes of steps S12 to S15 are applied only during packet transmission or reception and are not carried out during the other time of which the time ratio is larger than that of the time of packet transmission and reception, and therefore, an increase in interference does not occur during such other time.

The object of the present invention can be achieved only by the operation of step S15 in the mobile station 3, and the object of the present invention can also be achieved by performing the operation of step S15 and the operation of step S12 in the packet transmission base station 1 in combination thereof. Further, the object of the present invention can also be achieved only by carrying out the operation of step S13 and the operation of step S14 independently of each other in the packet transmission base station 1. Moreover, it is sufficient to only increase the power balancing reference power in step S14.

Figure 2:
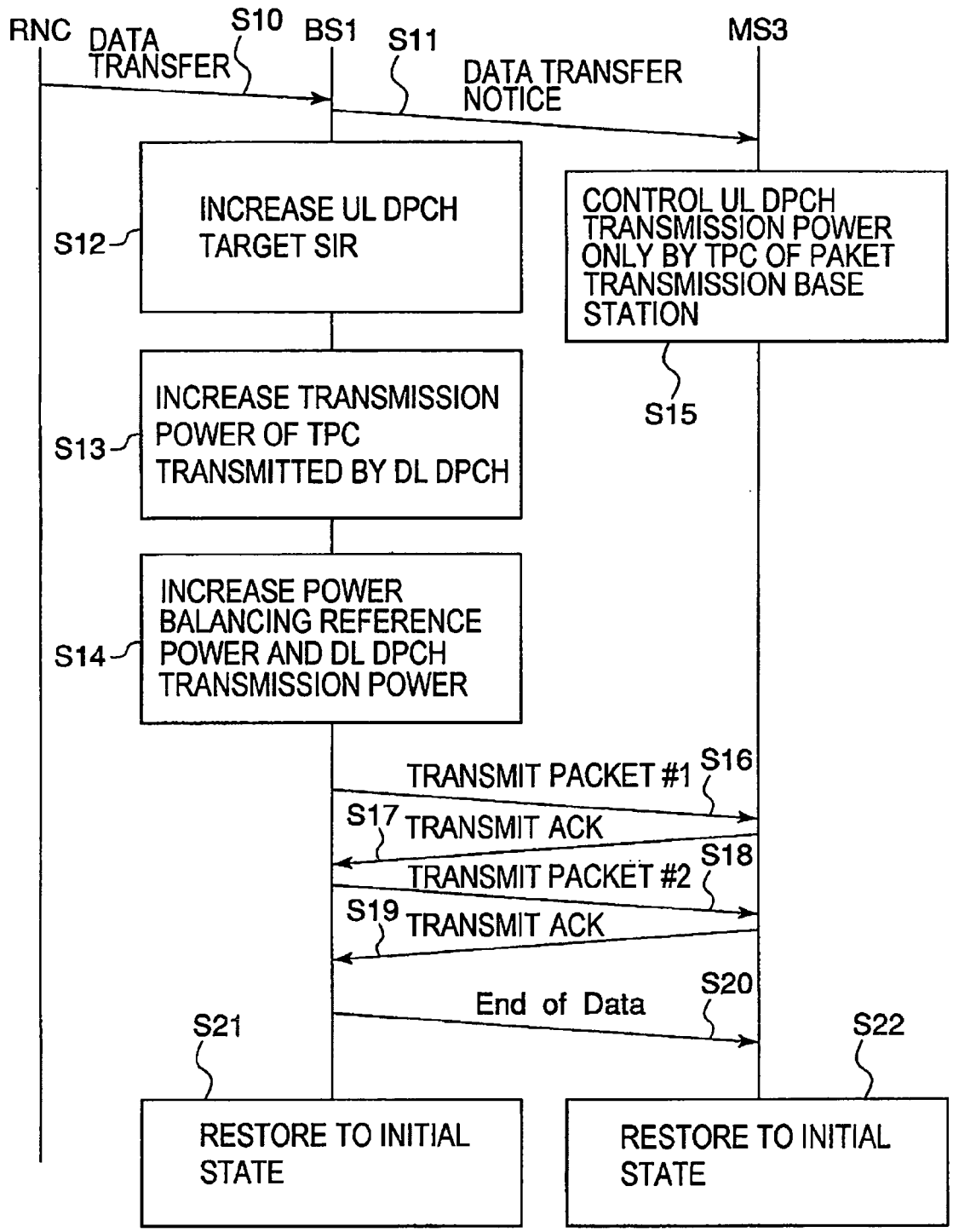
FIG. 2 is a sequence diagram showing operation of an embodiment 1 of the present invention.
Figure 3:
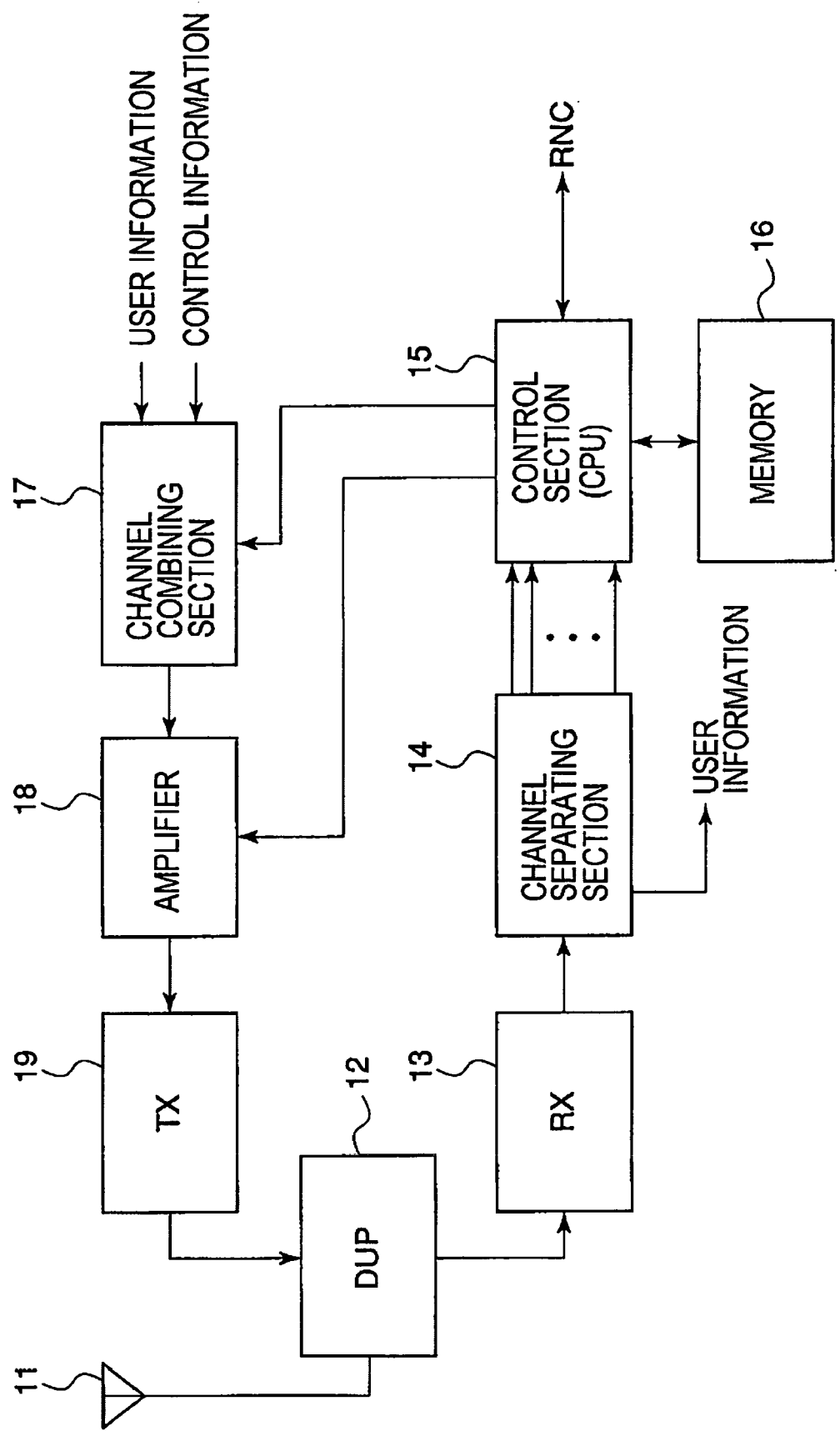
FIG. 3 is a block diagram of a base station in the embodiment of the present invention.
Figure 4:
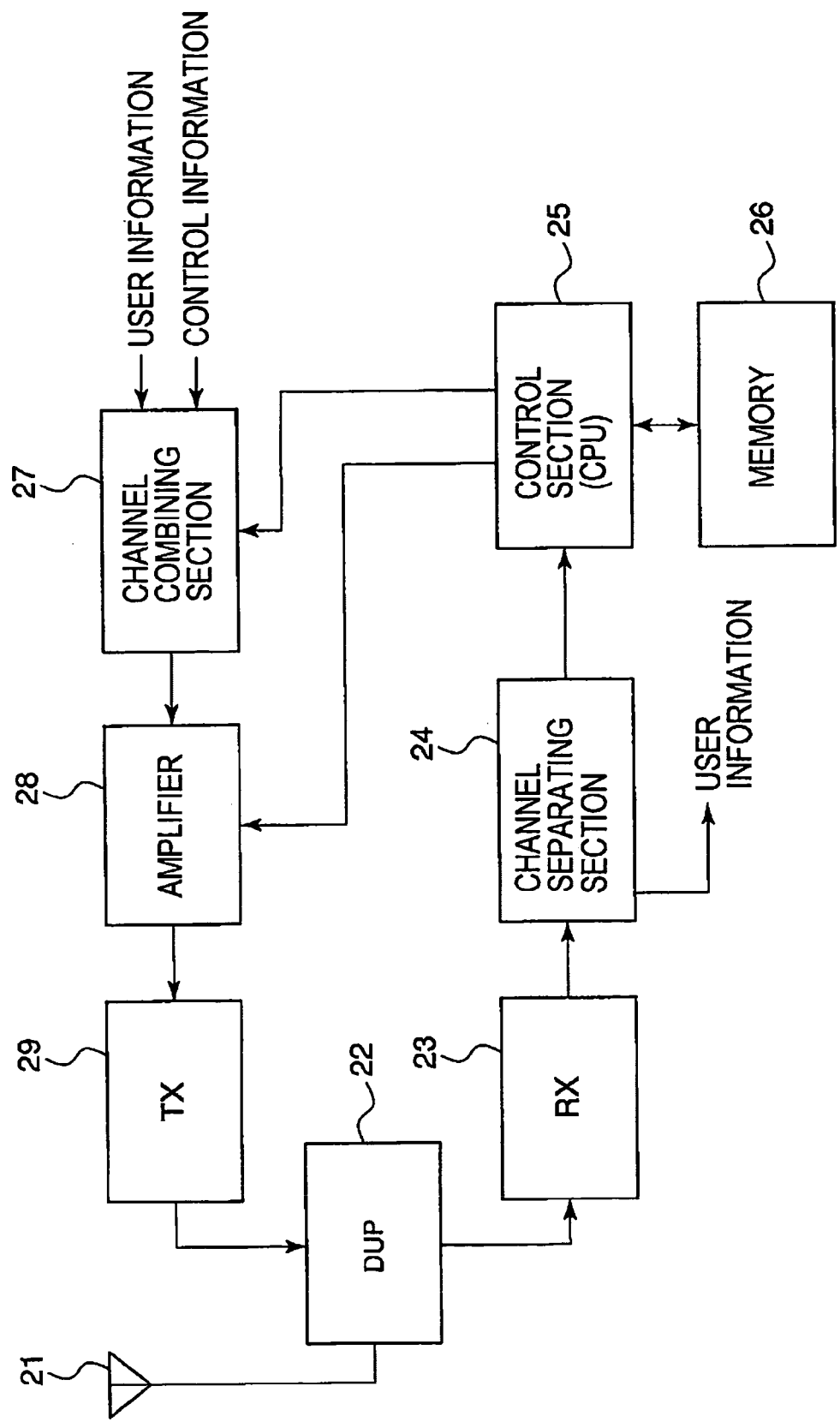
FIG. 4 is a block diagram of a mobile station in the embodiment of the present invention.

FIGS. 3 and 4 are schematic functional block diagrams respectively of a base station and a mobile station for realizing the foregoing embodiment 1. Referring to FIG. 3, in the base station, a received signal from an antenna 11 is inputted via an antenna duplexer (DUP: Duplexer) 12 into a receiving section 13 where processes such as amplification, frequency conversion, and demodulation are carried out. A demodulated output is separated into user information and various control information by a channel separator 14. These control information is inputted into a control section (CPU) 15 where the processes of steps S12 to S14, S21, and so forth shown in the sequence diagram of FIG. 2 are performed according to a program procedure prestored in a memory 16.

On the other hand, user information and control information for a mobile station are combined together in a channel combining section 17, amplified by an amplifying section 18 and supplied into a transmission section 19 where processes such as modulation and frequency conversion are carried out, and transmitted via the antenna duplexer 12 and the antenna 11.

Referring to FIG. 4, in the mobile station, a received signal from an antenna 21 is inputted via an antenna duplexer 22 into a receiving section 23 where processes such as amplification, frequency conversion, and demodulation are carried out. A demodulated output is separated into user information and a TPC signal being control information by a channel separator 24. This TPC signal is inputted into a control section (CPU) 25 where the processes of steps S15 and S22 shown in the sequence diagram of FIG. 2 are performed according to a program procedure prestored in a memory 26.

On the other hand, user information and control information for a base station are combined together in a channel combining section 27, amplified by an amplifying section 28 and supplied into a transmission section 29 where processes such as modulation and frequency conversion are carried out, and transmitted via the antenna duplexer 22 and the antenna 21.

Figure 5:
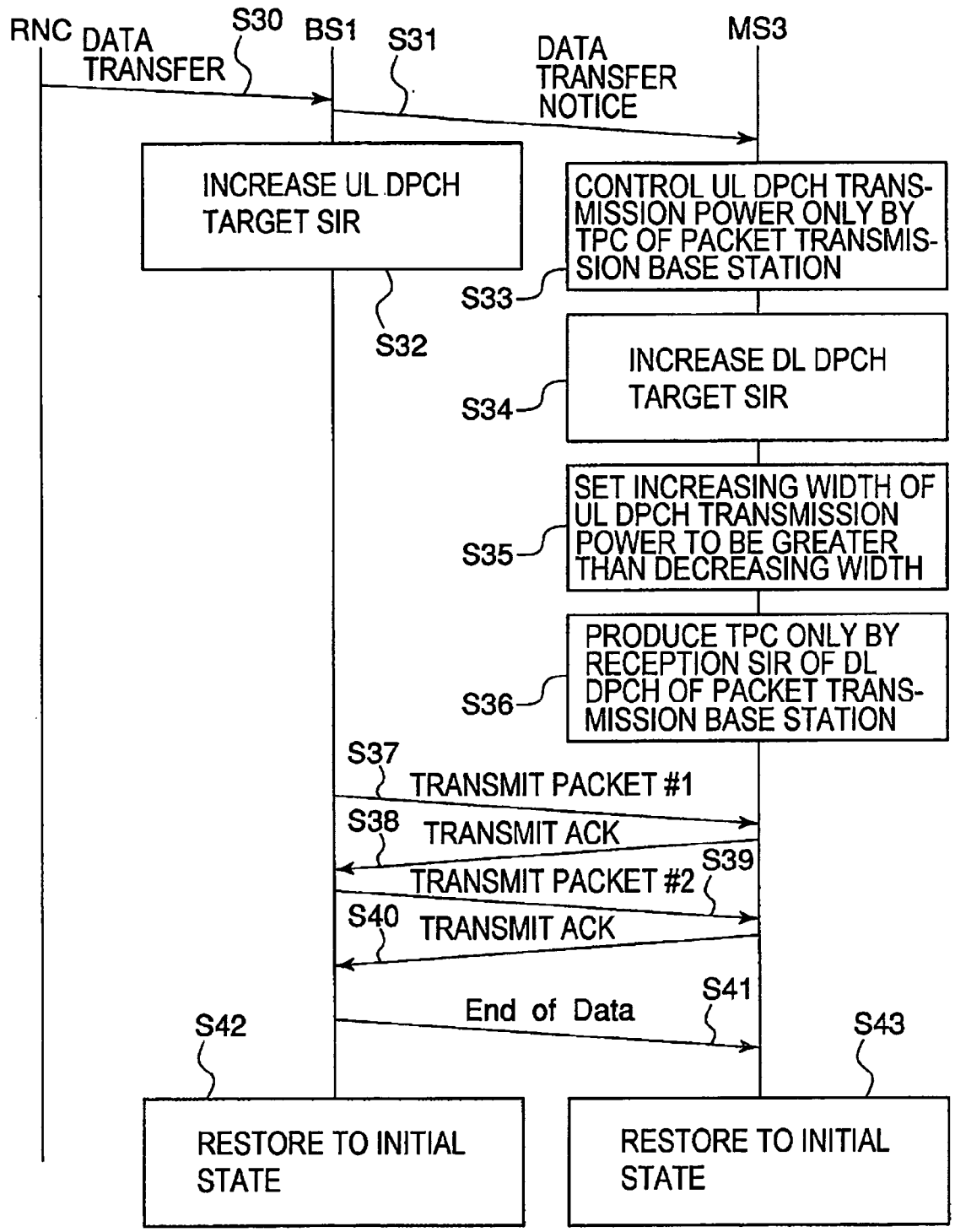
FIG. 5 is a sequence diagram showing operation of an embodiment 2 of the present invention.

Next, description will be given about the embodiment 2 of the present invention with reference to an operation sequence diagram of FIG. 5. When data to be transmitted to the mobile station 3 arrives at the RNC from the communication network, the RNC sends the data to the base station having the DPCH set by the mobile station 3. In this case, let the data be sent to the base station 1 (step S30).

The base station 1 gives a notice of data transfer to the mobile station 3 (step S31). Thereafter, the base station 1 increases a target value SIR for the reception quality of the UL DPCH by a predetermined value (step S32). On the other hand, in response to receipt of the data transfer notice from the base station 1, the mobile station 3 controls the transmission power of the UL DPCH transmitted by the own station, only according to a TPC signal transmitted by the packet transmission base station 1 (step S33). Further, the mobile station 3 increases a target SIR of the DL DPCH by a predetermined value (step S34).

Moreover, the mobile station 3 sets an increasing width of the transmission power control of the UL DPCH in the own station to be greater than a decreasing width to thereby control an increase and a decrease in control step to be asymmetric (step S35). That is, assuming that an increasing step is represented by $\Delta P_{up}$ and a decreasing step by $\Delta P_{down}$, it is set that $\Delta P_{up} > \Delta P_{down}$.

Furthermore, the mobile station 3 produces a TPC signal for a power control of the DL DPCH only by a reception SIR of the DL DPCH transmitted from the packet transmission base station 1 (step S36).

Thereafter, packets #1 and #2 obtained by dividing data into blocks are respectively transmitted from the base station 1 to the mobile station 3 by the use of the HS-PDSCH (steps S37 and S39), and ACK signals each indicative of reception of the packet are respectively transmitted from the mobile station 3 to the base station 1 by the use of the HS-DPCCH (steps S38 and S40). Upon completion of the data transmission, the base station 1 notifies end of data to the mobile station 3 (step S41). In response to the completion of the data transmission, the base station 1 restores the value changed in step S32 to an initial value (step S42), and the mobile station 3 restores the processes changed in steps S33 to S36 to initial ones (step S43). Also in this example, instead of the notification of end of data, it may be configured to restore to the initial state before the packet transmission when a packet is not transmitted over a predetermined time.

In this embodiment 2, by increasing the DL DPCH target SIR (step S34) in the mobile station 3 in addition to carrying out the same processes (S32 and S33) as those of steps S12 and S15 in the sequence diagram of FIG. 2 in the embodiment 1, the reception quality of the TPC signal received at the mobile station is improved so that the uplink transmission power control accuracy is enhanced. Thus, the reception quality of the ACK/NACK signal at the packet transmission base station is improved.

Further, by making asymmetric the control steps of the UL DPCH transmission power to set the increasing step greater than the decreasing step (step S35) in the mobile station 3, it is possible to increase the transmission power so as to immediately achieve a desired reception quality. Therefore, the desired quality can be ensured even during a short transmission time like that of a packet. Further, by producing the TPC signal only by the reception SIR of the DL DPCH from the packet transmission base station (step S36), the reception quality of the subject DL DPCH at the mobile station is made excellent to enable correct reception of the TPC signal included therein, and consequently, the HS-DPCCH transmitted from the mobile station can be correctly received at the base station 1.

Further, in this embodiment 2, the processes of steps S32 to S36 are applied only during packet transmission or reception and are not carried out during the other time of which the time ratio is larger than that of the time of packet transmission and reception, and therefore, an increase in interference does not occur during such other time.

The object of the present invention can be achieved only by carrying out the operation of step S34 and the operation of step S36 independently of each other in the mobile station 3. Further, the object of the present invention can also be achieved by combining together the operation of step S32 in the packet transmission base station 1 and the operation of step S33 in the mobile station 3 and by further combining thereto the operation of step S35 in the mobile station 3.

It is obvious that the schematic functional block diagrams of FIGS. 3 and 4 are also applicable to the base station and the mobile station for realizing this embodiment 2.

Figure 6:
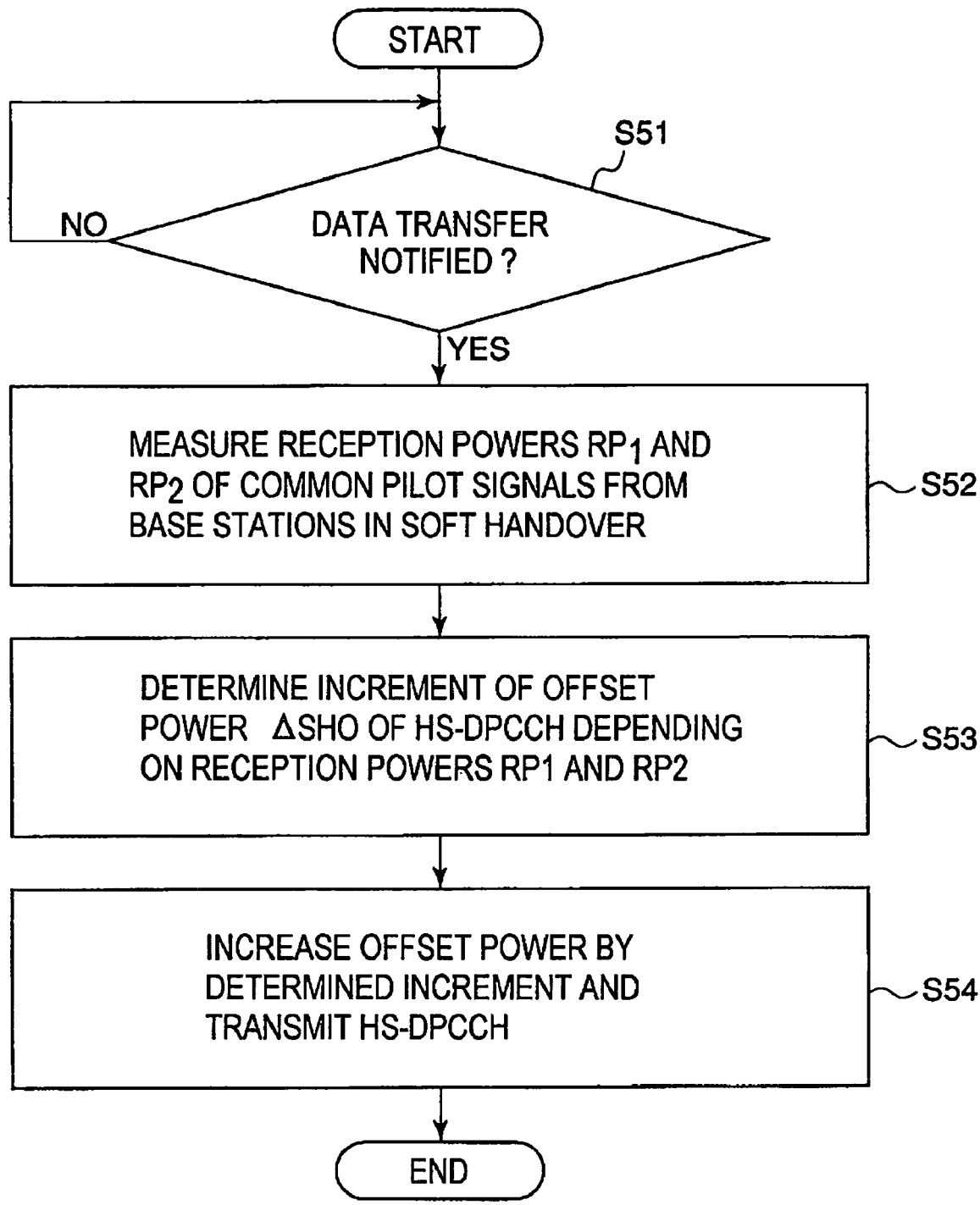
FIG. 6 is a flowchart showing operation of a mobile station in an embodiment 3 of the present invention.

Next, referring to the flows in FIGS. 6 and 7, description will be given about the embodiment 3 according to the present invention. FIG. 6 shows the operation flow in the mobile station, wherein, in response to a data transfer notice from the packet transmission base station 1 (step S51), the mobile station 3 determines an increment of an offset power $\Delta SHO$ of the HS-DPCCH depending on qualities of downlinks transmitted at predetermined transmission powers by the connection base stations 1 and 2. Specifically, the mobile station 3 measures reception powers $RP_1$ and $RP_2$ of the common pilot signals from the connection base stations 1 and 2 in the soft handover state (step S52) to thereby judge the downlink qualities.

Depending on the reception powers $RP_1$ and $RP_2$, the increment of the offset power $\Delta SHO$ of the HS-DPCCH is determined (step S53). Specifically, the offset power $\Delta SHO$ is calculated from an equation given by $$\Delta SHO = \Delta NON\text{-}SHO + 10 \log_{10}\{\max(RP_1, RP_2)/RP_1\} \text{ (dB)} \quad (2)$$

where $\Delta NON\text{-}SHO$ represents an offset power in the non soft handover state, and $\max(RP_1, RP_2)$ represents maximum values among $RP_1$ and $RP_2$.

Accordingly, when $RP_1 > RP_2$, $\Delta SHO = \Delta NON\text{-}SHO$, while, when $RP_1 < RP_2$, $$\Delta SHO = \Delta NON\text{-}SHO + 10 \log_{10}(RP_2/RP_1) \quad (3)$$

where the second term on the right side represents the increment of the offset power. The HS-DPCCH is transmitted while increasing the offset power by the determined increment (step S54).

Figure 7:
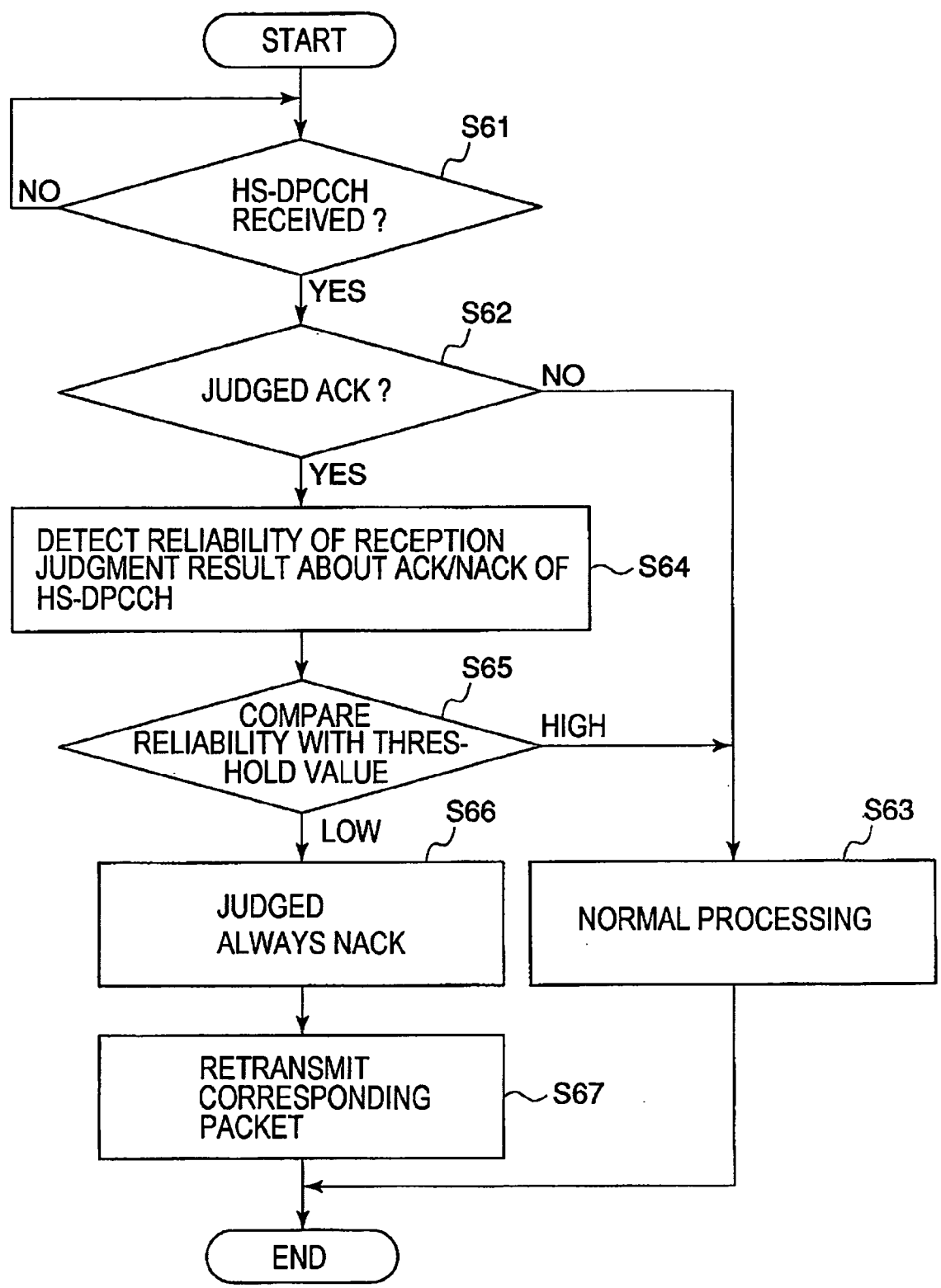
FIG. 7 is a flowchart showing operation of a base station in embodiments 3 and 4 of the present invention.

FIG. 7 shows the operation flow of the packet transmission base station in this embodiment 3. Note that this flow of FIG. 7 is common to operation of a base station in the next embodiment 4. Referring to FIG. 7, in response to receipt of the HS-DPCCH (step S61), judgement is made about ACK/NACK and, if judged to be "NACK" (NO in step S62), normal processing is carried out (step S63). That is, since it is "NACK", a corresponding packet is retransmitted.

If judged to be "ACK" in step S62, the packet transmission base station operates to determine packet transmission in uplink depending on a reliability of the reception judgment result about ACK/NACK of the HS-DPCCH. Specifically, the packet transmission base station detects the reliability of the ACK/NACK reception judgment result (step S64) and compares this reliability with a predetermined threshold value (step S65). If the reliability is higher than the threshold value, the packet transmission base station shifts to normal processing (step S63), while, if it is lower, the packet transmission base station judges that it is always NACK regardless of the ACK or NACK signal (step S66). Thus, a corresponding packet is retransmitted (step S67).

According to this embodiment 3, depending on a propagation loss in uplink of the packet transmission base station as compared with the other base station in the connection base stations, i.e. when the propagation loss is large, a relatively large offset power ($\Delta SHO$) is set, while, when it is small, a relatively small offset power is set. Therefore, it is possible to compensate for degradation in ACK/NACK signal reception quality caused by the propagation loss. On the other hand, if NACK is erroneously judged to be ACK in the ACK/NACK judgment in the packet transmission base station, a packet loss is caused. Accordingly, by judging that it is always NACK depending on the reliability of the reception judgment result when judged to be ACK, the NACK error rate is decreased to enable reduction in packet loss rate so that the throughput can be improved.

In this embodiment, the number of the base stations in the soft handover state is set to two, but it is clear that $\max\{RP_1, RP_2\}$ in the foregoing equation (2) becomes $\max\{RP_1, RP_2, RP_3, \ldots\}$ in case of three or more.

The operations in FIGS. 6 and 7 can, of course, be realized by the respective functional blocks shown in FIGS. 3 and 4.

Figure 8:
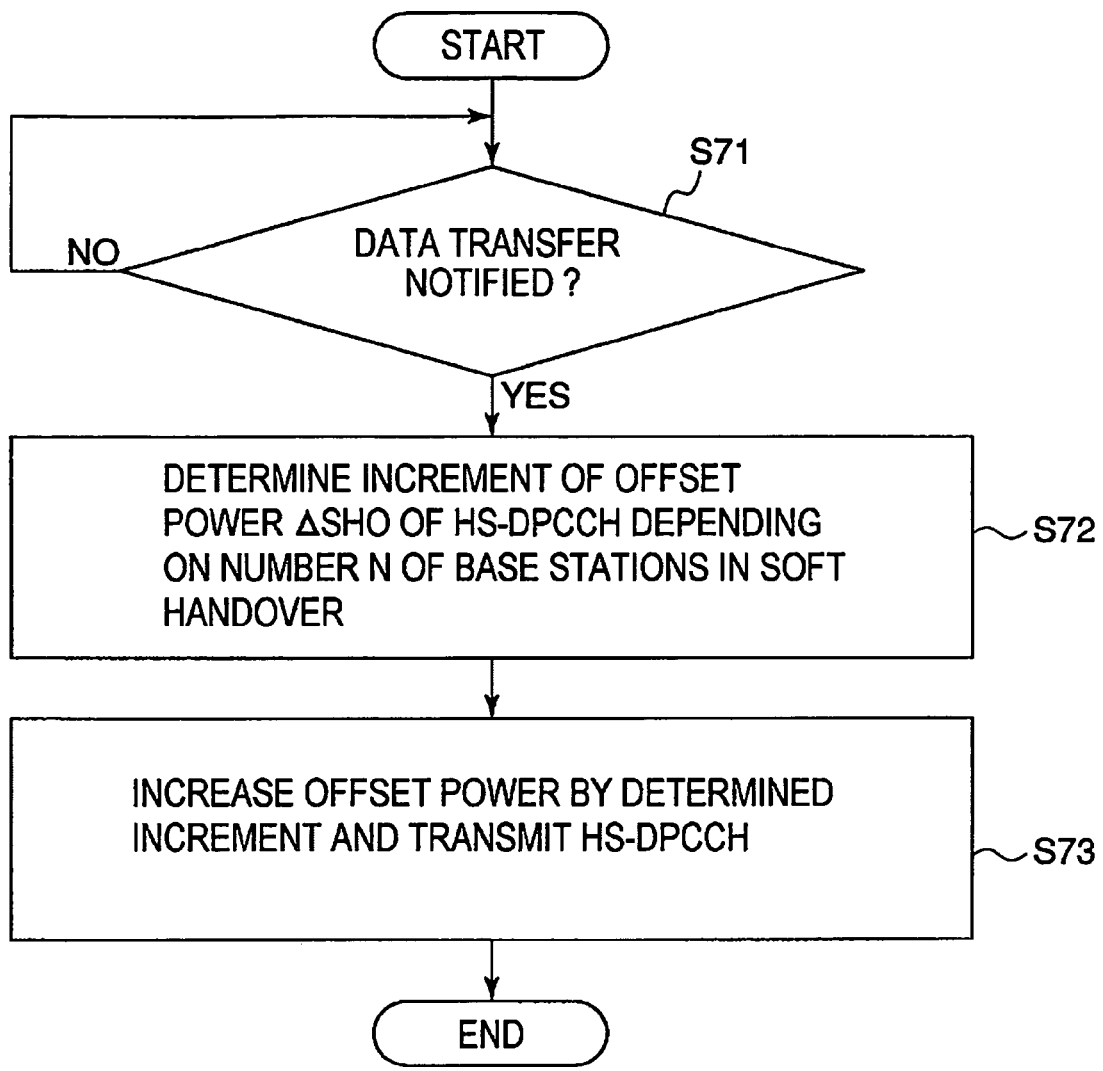
FIG. 8 is a flowchart showing operation of a mobile station in the embodiment 4 of the present invention.

The embodiment 4 of the present invention will be described. FIG. 8 is a flowchart of operation of a mobile station in this embodiment 4. In response to a data transfer notice (step S71), the mobile station determines an increment of an offset power $\Delta SHO$ of the HS-DPCCH depending on the number N of base stations in the soft handover (step S72). Specifically, the offset power is calculated according to an equation given by $$\Delta SHO = \Delta NON\text{-}SHO + 10 \log_{10} N \text{ (dB)} \quad (4)$$

and therefore, the increment of the offset power is represented by the second term on the right side of the equation (4). The HS-DPCCH is transmitted by using the offset power of the equation (4) increased by that increment (step S73). The operation flow of the packet transmission base station in this embodiment 4 is the same as that shown in FIG. 7.

In this embodiment 4, the following effects are achieved. Specifically, as the number N of the base stations in the soft handover increases, the DPCH reception diversity gain increases so that the DPCH transmission power is reduced. In the mobile station, however, it is configured that as this number N increases, the increment of the offset power of the HS-DPCCH also increases correspondingly. Therefore, the reception quality of the HS-DPCCH can be controlled to satisfy a required value regardless of the number of the base stations in the soft handover.

On the other hand, the base station receives a bit sequence signal transmitted by the mobile station and judges whether it is ACK or NACK but, when the reception quality of the bit sequence is poor, the reliability of that signal information is lowered. In this event, it may happen that although NACK is sent from the mobile station, it is judged to be ACK. In view of this, the data transmission base station (packet transmission base station) in the present invention judges that it is always NACK depending on the reliability of the reception judgment result about ACK/NACK of the HS-DPCCH. This can decrease the NACK error rate to thereby enable reduction in packet loss rate. Further, since it is configured that the reliability of the reception judgment result about ACK/NACK of the HS-DPCCH is not always calculated, but calculated only when it is judged to be ACK, it is possible to reduce a load for this calculation.

Further, in this embodiment 4, the processes in FIG. 8 are applied only during packet reception in the mobile station and are not carried out during the other time of which the time ratio is larger than that of the time of packet reception, and therefore, an increase in interference does not occur during such other time.

The operations in the foregoing embodiment 4 can, of course, also be realized by the respective functional blocks shown in FIGS. 3 and 4.

Figure 10:
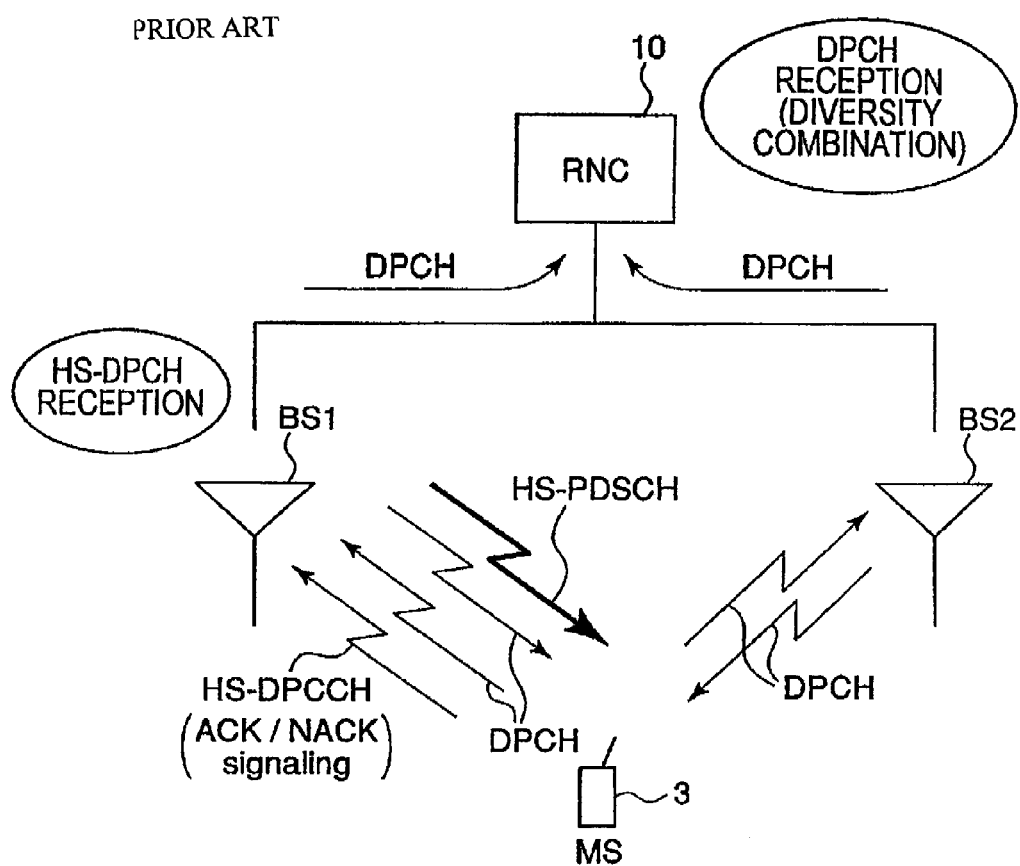
FIG. 10 is a schematic diagram for explaining general operation in a cellular system.

The embodiment 5 of the present invention will be described. In the embodiment 5, as shown in FIG. 10, the uplink DPCHs are subjected to diversity combination between the connection base stations 1 and 2 in the radio network control station (RNC) 10. The DPCH is normally controlled to achieve a predetermined reception quality by the high-speed closed-loop transmission power control. Specifically, the mobile station increases or decreases the transmission power of the DPCCH according to TPC bits transmitted from the base station, and the DPDCH is transmitted at a transmission power $P_{DPDCH}$ which is the sum of a transmission power $P_{DPCCH}$ of the DPCCH and a predetermined offset power $\Delta 1$ added thereto. That is, the DPDCH is transmitted in a relationship of $$P_{DPDCH} = P_{DPCCH} + \Delta 1 \text{ (dB)} \quad (5)$$

Further, the HS-DPCCH is transmitted at a transmission power PH which is the sum of a transmission power $P_{DPCCH}$ of the DPCCH and a predetermined offset power $\Delta 2$ added thereto. That is, the HS-DPCCH is transmitted in a relationship of $$PH = P_{DPCCH} + \Delta 2 \text{ (dB)} \quad (6).$$

In the equations (5) and (6), the respective values are decibel values.

This operation is substantially the same as that in the embodiment 1. In this embodiment 5, however, when the transmission power of the mobile station is restricted to a predetermined maximum value, the transmission power of the HS-DPCCH is preferentially ensured while the transmission power of the DPDCH is suppressed. Other than this point, it is the same as the embodiment 1. The control for suppressing the transmission power of the DPDCH is implemented in the control section 25 of the mobile station in FIG. 4.

Figure 9:
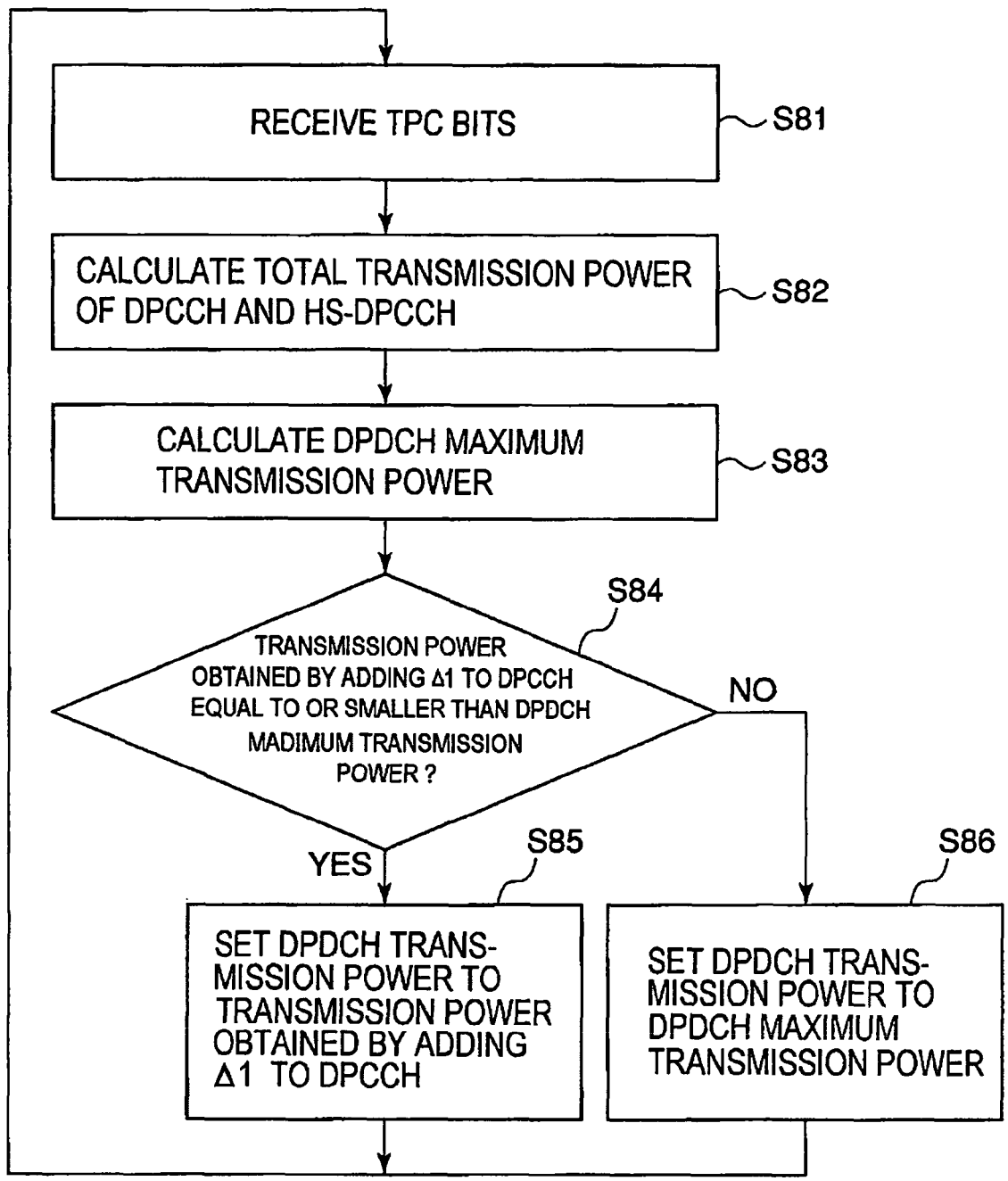
FIG. 9 is a flowchart showing operation of a mobile station in an embodiment 5 of the present invention.

FIG. 9 shows the flow of the DPDCH transmission power control in this embodiment 5. Referring to FIG. 9, the mobile station receives TPC bits (step S81), calculates a total transmission power of the DPCCH and the HS-DPCCH (step S82), and calculates a maximum transmission power allocable to the DPDCH (step S83). This DPDCH maximum transmission power is obtained by subtracting the total transmission power of the DPCCH and the HS-DPCCH from a predetermined maximum value of the transmission power.

Then, when the DPDCH transmission power calculated by the equation (5) does not exceed the DPDCH maximum transmission power, the DPDCH transmission power is set to a value calculated by the equation (5) (step S85), while, when the DPDCH transmission power calculated by the equation (5) exceeds the DPDCH maximum transmission power, the DPDCH transmission power is suppressed and set to the DPDCH maximum transmission power (step S86).

On the other hand, as a method of suppressing the DPDCH transmission power, it may be configured to temporarily reduce the magnitude of the offset value $\Delta 1$ in the equation (5) when the total transmission power of the mobile station approaches the predetermined maximum value.

In this embodiment 5, the following effects are achieved. Specifically, when the propagation loss from the mobile station to the base station is large or when the interference wave power received at the packet transmission base station is large, it is necessary for the mobile station to transmit the HS-DPCCH at a large transmission power. On the other hand, if the ratio in transmission power between the DPCCH and the DPDCH is kept constant, the transmission power of the HS-DPCCH cannot be sufficiently increased when the transmission power of the mobile station reaches the predetermined maximum value. Thus, there is a possibility of degradation in reception quality of the ACK/NACK signal included in the HS-DPCCH.

In this embodiment 5, however, since the DPDCH transmission power is suppressed when the transmission power of the mobile station is restricted to the predetermined maximum value, the transmission power allocable to the HS-DPCCH increases to thereby reduce the possibility of degradation in reception quality of the ACK/NACK signal. As a result, the reception quality of the ACK/NACK signal is improved in the packet transmission base station so that the throughput of data transmission by the HS-DPSCH increases.

Further, in the embodiment 5, as shown in step S15 in the embodiment 1, in the soft handover state where the mobile station sets the dedicated channels with respect to the plurality of base stations, the transmission power control of the UL DPCH transmitted by the mobile station is carried out during packet reception only according to the TPC signal of the packet transmission base station. In this event, there is an instance where the mobile station increases the transmission powers of the DPCCH and the DPDCH because the reception qualities of the DPCCH and the DPDCH at the packet transmission base station do not satisfy predetermined quality targets although the reception qualities of the DPCCHs and the DPDCHs satisfy predetermined quality targets in the base stations other than the packet transmission base station among the base stations that are in the state of soft handover with that mobile station. In this case, the DPDCH transmission power is increased more than necessary. This is because the DPDCHs received at the plurality of base stations in the soft handover state are subjected to diversity combination. Therefore, in the soft handover state, the possibility is relatively high that the transmission power of the mobile station is restricted to the predetermined maximum value.

In this embodiment 5, however, the DPDCH transmission power is suppressed so as not to restrict the HS-DPCCH transmission power by the maximum value of the transmission power of the mobile station. Therefore, particularly in the soft handover state, the effect increases in improving the ACK/NACK signal reception quality at the packet transmission base station.

As described above, according to the present invention, there is the effect that even when the mobile station is in the soft handover state and sets the DPCHs with respect to the plurality of base stations, the packet transmission base station can receive the HS-DPCCH with the sufficient quality, thus resulting in reduction in error rate of the ACK/NACK signal included in the subject HS-DPCCH and indicative of yes or no about correct packet reception to thereby eliminate the packet loss, so that the improvement in throughput can be achieved.

Further, the foregoing ACK/NACK signal error rate reduction control is performed only during packet transmission and reception in the soft handover state and is not carried out during packet waiting of which the time ratio is larger than that of the time of the packet transmission and reception. Therefore, it is possible to reduce the ACK/NACK signal error rate without increasing the transmission power, and further, the UL/DL DPCH diversity effect during the soft handover is not spoiled at all.

Industrial Applicability

The present invention is applicable to a cellular system including a mobile station and base stations and, in particular, to the system wherein an ACK/NACK is transmitted from the mobile station to the base station via an HS-DPCCH.

The invention claimed is:

1. A cellular system comprising a mobile station and a plurality of base stations that are in a handover state with said mobile station, one of said base stations, as a packet transmission base station, performing transmission of a packet to said mobile station by the use of a shared channel, characterized in that:

said mobile station comprises:

means for improving, a reception quality of a transmission power control signal included in a downlink dedicated channel sent only from the packet transmission base station among the base stations being in the handover state with said mobile station, by increasing a target SIR and by producing the transmission power control signal indicating the packet transmission base station to increase a transmission power of the downlink dedicated channel based on the increased target SIR.

2. A cellular system as claimed in claim 1, wherein said mobile station further comprises:

means for producing the transmission power control signal for controlling transmission power of the downlink dedicated channel on the basis of the target SIR to transmit the transmission power control signal to the packet transmission base station through the uplink dedicated channel.

3. A mobile station that performs handover with a plurality of base stations, said mobile station comprising:

means for receiving a packet by the use of a shared channel sent from a packet transmission base station that is transmitting the packet among the base stations; and means for controlling a target SIR to improve a reception quality of a transmission power control signal included in a downlink dedicated channel received only from the packet transmission base station among the base stations being in the handover state with said mobile station, by increasing the target SIR and by producing the transmission power control signal indicating the packet transmission base station to increase a transmission power of the downlink dedicated channel based on the increased target SIR.

4. A mobile station as claimed in claim 3, wherein said mobile station further comprises:

means for producing the transmission power control signal for controlling transmission power of the downlink dedicated channel on the basis of the target SIR to transmit the transmission power control signal to the packet transmission base station through the uplink dedicated channel.

5. A communication control method of performing handover in a mobile station with a plurality of base stations, comprising:

receiving a packet by the use of a shared channel from a packet transmission base station that is transmitting the packet among the plurality of the base stations; and controlling a target SIR to improve, a reception quality of a transmission power control signal included in a downlink dedicated channel transmitted only from the packet transmission base station among the base stations being in the handover state with said mobile station, by increasing a target SIR and by producing the transmission power control signal indicating the packet transmission base station to increase a transmission power of the downlink dedicated channel based on the increased target SIR.

6. A communication control method as claimed in claim 5, said communication control method further comprising:

producing the transmission power control signal for controlling transmission power of the downlink dedicated channel on the basis of the target SIR to transmit the transmission power control signal to the packet transmission base station through the uplink dedicated channel.

7. A cellular system comprising a mobile station and a plurality of base stations that are in a handover state with said mobile station, one of said base stations, as a packet transmission base station, performing transmission of a packet to said mobile station by the use of a shared channel, characterized in that:

said mobile station comprises:

a module that improves a reception quality of a transmission power control signal included in the downlink dedicated channel sent only from the packet transmission base station among the base stations being in the handover state with said mobile station, by increasing a target SIR and by producing the transmission power control signal indicating the packet transmission base station to increase a transmission power of the downlink dedicated channel based on the increased target SIR.

8. A cellular system as claimed in claim 7, wherein said mobile station further comprises:

a module that produces the transmission power control signal for controlling transmission power of the downlink dedicated channel on the basis of the target SIR to transmit the transmission power control signal to the packet transmission base station through the uplink dedicated channel.

9. A mobile station that performs handover with a plurality of base stations, said mobile station comprising:

a module that receives a packet by the use of a shared channel sent from a packet transmission base station that is transmitting the packet among the base stations; and a module that controls a target SIR to improve, a reception quality of a transmission power control signal included in a downlink dedicated channel received only from the packet transmission base station among the base stations being in the handover state with said mobile station increasing a target SIR and by producing the transmission power control signal indicating the packet transmission base station to increase a transmission power of the downlink dedicated channel based on the increased target SIR.

10. A mobile station as claimed in claim 9, wherein said mobile station further comprises:

a module that produces the transmission power control signal for controlling transmission power of the downlink dedicated channel on the basis of the target SIR to transmit the transmission power control signal to the packet transmission base station through the uplink dedicated channel.

* * * * *